United States Patent [19]

Fossey

[11] Patent Number: 4,688,322
[45] Date of Patent: Aug. 25, 1987

[54] SOLID ELECTROLYTE CHIP CAPACITOR METHOD

[75] Inventor: Mary A. Fossey, Ogunquit, Me.

[73] Assignee: Sprague Electric Company, North Adams, Mass.

[21] Appl. No.: 826,643

[22] Filed: Feb. 6, 1986

[51] Int. Cl.⁴ .............................................. H01G 9/00
[52] U.S. Cl. ..................................... 29/570.1; 361/433
[58] Field of Search ................... 29/570; 361/433, 306, 361/308, 309, 310

[56] References Cited

U.S. PATENT DOCUMENTS

| | | | |
|---|---|---|---|
| 3,290,571 | 12/1966 | Robinson | 361/308 |
| 3,491,269 | 1/1970 | Booe | 361/433 |
| 3,564,348 | 2/1971 | Cheseldine | 361/433 |
| 3,849,708 | 11/1974 | Leighton | 361/310 X |
| 3,855,505 | 12/1974 | Karlik et al. | 29/570 X |
| 4,090,288 | 5/1978 | Thompson et al. | 29/570 |
| 4,203,194 | 5/1980 | McGrath | 29/570 |
| 4,310,566 | 1/1982 | McGrath | 427/80 |
| 4,538,205 | 8/1985 | Lavene | 361/308 |
| 4,561,041 | 12/1985 | Crowley, Jr. et al. | 361/433 |

FOREIGN PATENT DOCUMENTS 215420 11/1984 German Democratic Rep. .
225512 12/1984 Japan .

Primary Examiner—Donald A. Griffin

[57] ABSTRACT

A solid-electrolyte chip capacitor of improved volume efficiency and placement capability is attained by molding a solid-electrolyte capacitor section so that the cathode end of the capacitor section is not covered by the molding material, and the anode end of the molding is provided with a recess within which the riser from the anode of the capacitor section is accessible.

4 Claims, 7 Drawing Figures

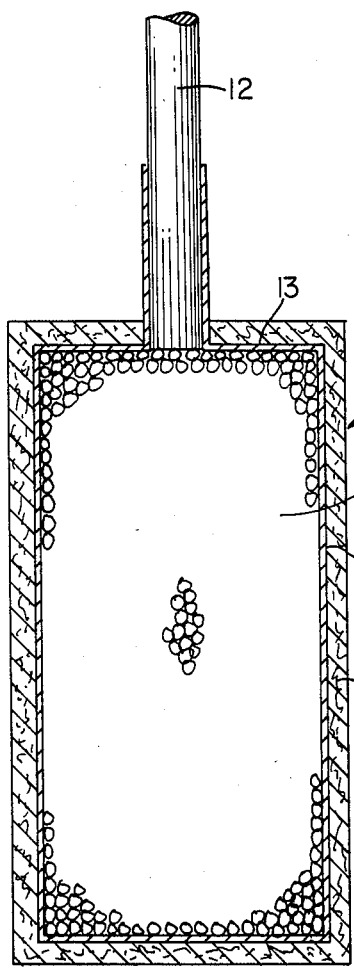
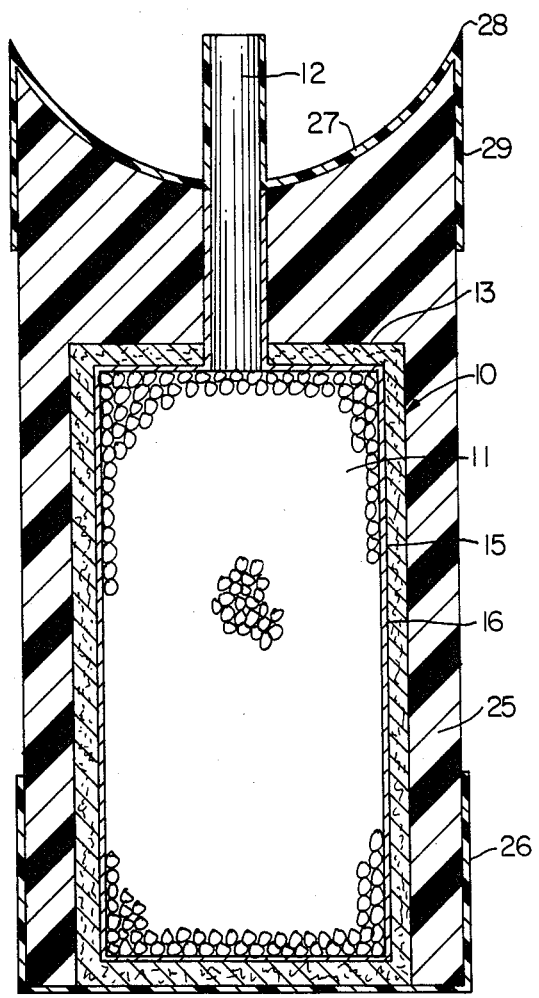
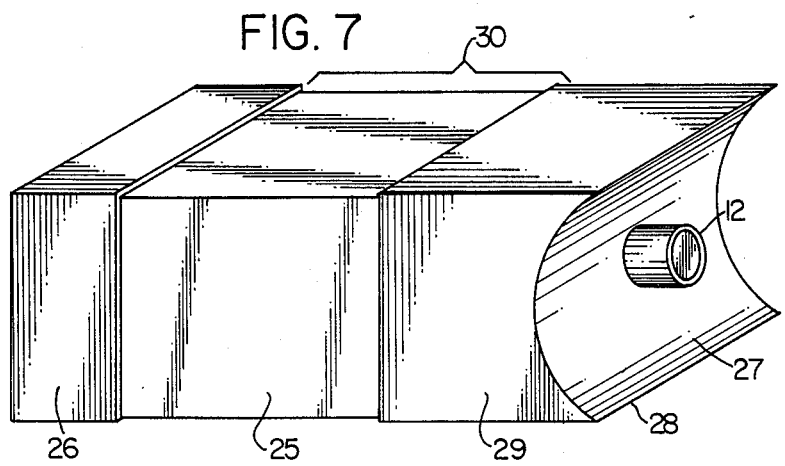

SOLID ELECTROLYTE CHIP CAPACITOR METHOD

This invention relates to a method for making solid electrolyte capacitors having end caps particularly adapted for handling by automatic inserting equipment and procedures and more particularly to solid electrolyte chip capacitors.

Solid electrolyte capacitors comprised of porous valve-metal pellets anodically formed with dielectric oxide on which is deposited first a suitable solid electrolyte layer and then a metallic counterelectrode are contained within an insulative resin coating to protect and seal the unit. Anode and cathode end caps are then formed over the oposite ends of each pellet. A chip solid electrolyte capacitor has a parallelepiped body having height, length and width dimensions with an anode wire at one end.

In order to obtain good volumetric efficiency in the capacitor unit the cathode end cap is formed in direct physical and electrical contact with cathode contact of the counterelectrode.

A desired object of this invention is the provision of resin coated capacitor units having improved volumetric efficiency which are readily and easily adapted to automatic handling, such as automatic insertion in the assembly of components in circuit connections. To assist in attaining the object it is desirable to produce capacitors in which the active sections are encapsulated in a molded compound. It is an object that application of a molded compound is so regulated and standardized that a large number of sections have applied to them only the essential amount of encapsulant.

It is an object of this invention to provide a solid electrolyte chip capacitor having trim construction in that a molded encapsulant has smooth surfaces and sharply angular edges.

A further object is a method of making a solid electrolyte capacitor pellet construction having a molded insulating coating having flat ends.

These and other objects will become more apparent upon consideration of the following description together with the drawings.

BRIEF DESCRIPTION OF THE DRAWINGS

FIG. 1 is a side sectional view of a capacitor body which is the subject of this invention;

FIG. 6 is a sectional view of a finished capacitor of the present invention; and FIG. 7 is a pictorial view of the finished capacitor.

SUMMARY OF THE INVENTION

Figure 2:
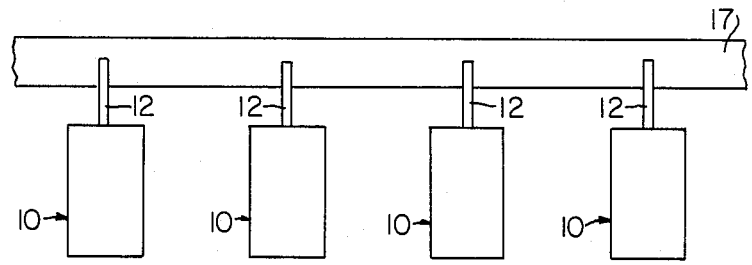
FIG. 2 is an elevational side view of a plurality of capacitor bodies of this invention attached by their anode wires to a carrier bar.

This invention relates to a method of making encapsulated solid electrolyte chip capacitors which have good volumetric efficiency. The invention provides an encapsulated chip capacitor having the anode lead terminated so that the capacitor may be flush mounted in its assembly into circuitry.

A method is provided for encapsulating chip capacitor bodies by transfer molding with a good ratio of the volt-microfarad product to the size of the unit. Terminations are composed of conductive coatings applied by dipping the ends of the chips or by painting at least one wall of the chip. Solderable coatings are applied over the conductive coatings. There is provided a coated unit readily handled in the assembly of units in circuit connections.

In general the method of this invention involves the steps of inserting a carrier rack of capacitor bodies into a row of mold cavities of a mold for transfer molding. The rack of capacitor bodies is positioned in the mold so that the bottom ends of the bodies opposite the riser wire attached to the carrier bar are firmly seated against a surface. For example, the ends of the bodies are sealed against an adhesively coated tape, an adhesive surface of a deformable layer on a firm backing. The row of mold cavities are closed on the bodies thus engaged at their bottom ends, as by moving two matching halves together. Each body is enclosed in a cavity with adjacent cavities sealed from each other. With the capacitor bottom seated against the adhesively coated tape, the adhesive surface at the bottom ends both closes these individual cavities and forms a seal diametrically across the ends of the bodies opposite the riser wires. At the same time the side surface of the bodies are spaced from the interior vertical walls of the mold cavities which are substantially and essentially parallel to the axes of the capacitor bodies. These vertical walls extend to and engage a surface such as the adhesive surface when the molds are in closed position. The top of the bodies are also spaced from the upper lateral extending interior wall of the cavities. Thus the molding compound when introduced into the cavities encompasses the top or anode end of the bodies and all of the side surfaces of the bodies but the contact of the bottoms of the bodies on the adhesive surface prevents the application of any substantial amount of molding compound on the bottom of the bodies.

At the same time that the bottom ends are maintained virtually free of molding compound, the side and top surfaces of the bodies are provided with an encapsulation of molding compound in good volumetric efficiency. Moreover, the side surface of the encased unit is smooth and angular with respect to the top and bottom ends of the finished units.

On completion of the molding step the carrier rack carries the encapsulated bodies demolded from the molds and as part of the removal step the bottoms are separated from the surface, such as the adhesive, so that the silver counterelectrode is still exposed and uncovered.

In a finishing step the encapsulated bodies suspended on the carrier rack are dipped into a silver composition to provide end caps or pressed against wheels to provide coatings on selective areas of silver. The silver coatings are covered by solderable layers, e.g. by plating as taught by McGrath in U.S. Pat. No. 4,203,194. The carrier rack of suspended units are removed from the silver composition and the end caps are cured.

The finished units then are removed from the carrier rack by cutting the anode wires.

The molded capacitor has a concavity or channel at the anode end and the anode riser wire is terminated at or within the plane which is defined by the borders of the concavity.

DESCRIPTION OF THE PREFERRED EMBODIMENT

FIG. 1 illustrates a body 10 of a solid electrolyte chip capacitor according to this invention prior to encasement in a molded compound. A porous tantalum pellet 11 as a parallelepiped body is shown having a tantalum riser wire 12 extending from its top end 13. The pellet 11 is film formed with tantalum oxide film. A solid electrolyte layer 15 overlies the oxide film. A counterelectrode 16 overlying the solid electrolyte layer covers the bottom end of the pellet 11 opposite the wire 12 and covers the bottom end of the pellet 11 with a conductor and covers the sides of the pellet 11.

As shown in FIG. 2 four chip capacitor bodies 10 are attached by their anode wires 12 to a carrier or holding bar 17. The bodies 10 are parallelepiped. The capacitor bodies 10 are suspended from the carrier bar 17 by the anode wires 12. A typical carrier bar 17 may have welded to it a number of capacitor bodies 10, thereby permitting batch processing steps for preparing the bodies 10 as represented by the body 10 in section of FIG. 1

Although the steps are shown as carried out by the four capacitor bodies 10 of FIG. 2 it will be understood that in FIGS. 2, 3, 4 and 5 there is depicted operations for an entire bar assembly of many more capacitor bodies.

FIG. 2 shows the capacitor bodies 10 at the completion of this application of the conductive counterelectrode 16. According to the present invention at this stage the bodies 10 are prepared and available for the application of an encasing molding compound.

Figure 4:
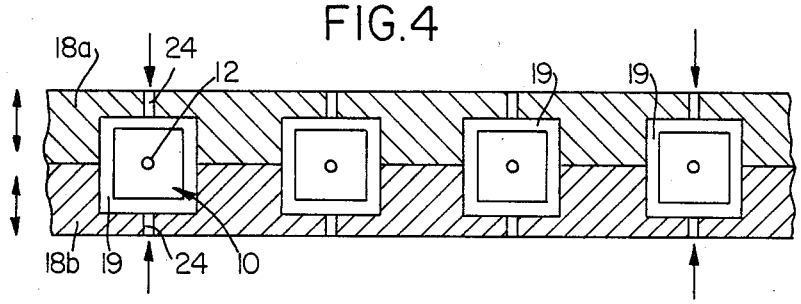
FIG. 4 is a sectional top view of the mold of FIG. 3 containing the capacitor bodies.
Figure 3:
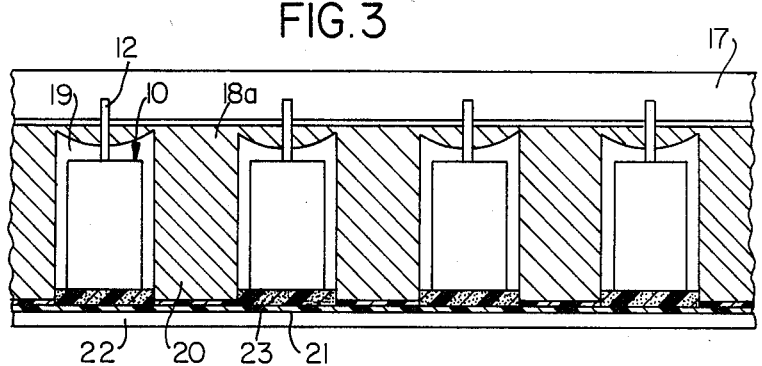
FIG. 3 shows in partially section side view a plurality of capacitor bodies of this invention attached to a carrier bar and positioned in a mold partly broken away.

FIG. 3 shows the capacitor bodies 10 carried by the carrier bar 17 with a mold 18 comprised of two parts 18a, which is shown in FIG. 3, and 18b, see FIG. 4. Cavities 19 in the parts 18a and 18b are formed by walls 20. These walls 20 enclose the top and sides of the cavities 19 and are partially shown in FIG. 3. The cavities 19 are formed with an opening at the end opposite to the capacitor anode wires 12. As shown in FIG. 4, the mold 18 is rendered complete for the molding step by placing the other part 18b over the bodies 10 to complete and enclose the cavities 19 around the bodies 10.

Referring further to FIG. 3, an adhesive, deformable tape 21 supported on a metal back 22 extends along the mold 18 at the open ends of the cavities 19. The mold walls 20 are forced into contact with the tape 21 so that the tape 21 closes the open ends of the cavities 19. The tape 21 has an adhesive surface layer 23 comprised so as to form a releasable seal with a surface that contacts it. The tape 21 and its support 22 form the bottom or closure of the mold 18 and the mold cavities 19. The bodies are pressed against the surface layer 23 and tape 21 which is composed of a suitably deformable material so as to provide with its adhesive surface layer 23 a seal across the cavities 19 at the cathode end of the bodies 10.

The side walls 20 of the mold parts 18a and 18b are also pressed into the tape 21 and sealed by the adhesive layer 23 so that the adjacent cavities are effectively sealed from each other when the remaining part is in place. Then a molding compound is introduced into the several closed mold cavities. The mold compound not shown in FIG. 3, encompasses the top or anode end of each capacitor body 10 and all of the surface of the sides of the bodies 10. The mold compound is suitably introduced through orifices 24 into the cavities 19 by a conventional extrusion technique, as shown in FIG. 4.

The mold compound is retained and confined away from the bottom of the bodies 10 because the tape 21 is provided on the surface contacting the capacitor bodies with the adhesive surface layer 23, and the bodies 10, walls 20 when pressed against the tape 21 form an effective seal with the layer 23 while the mold parts 18a and 18b are in place.

On completion of the molding step, the bar 17 with the molded bodies 10 are demolded with the tape 21 still in place. The tape is then removed after the molding step has been completed, leaving the individual bodies 10 each covered by an encapsulation 25 which encases the top and sides of the body 10 but is virtually absent from the bottom opposite the wire 12 end of the body 10.

Figure 5:
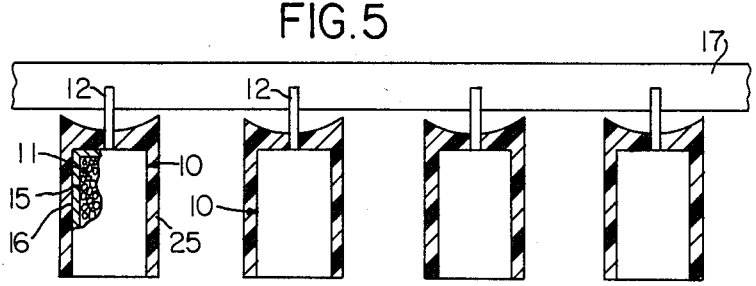
FIG. 5 shows in elevational side view a portion of a carrier bar to which are attached capacitor bodies of this invention at an interim stage in this manufacture.

The bodies 10 on the carrier bar 17 have mold encapsulation 25 when demolded from the mold 18a, 18b and the tape 21 removed. This interim assembly is shown in FIG. 5. The bodies 10 have the encapsulations 25 covering the sides and the ends 13 of the bodies 10. It is a feature of this invention that the encapsulation 25 does not cover the bottom end of the body thus the counterelectrode 16 at the opposite end from the riser wire 12 is uncovered at this stage of the procedure.

The encased bodies 10 supported on the carrier bar 17, as shown in FIG. 5 are now ready for the application of an end cap over the bottom or cathode end of the capacitor body 10. The end cap may consist of metal particles in a resin binder.

End caps 26 and 29 shown in FIGS. 6 and 7 may be formed at bottom and top ends of the bodies 10 by dipping the bodies 10 while carried on the bar 17 in an epoxy containing silver particles, Type 5004 conductive epoxy made by duPont. Curing is accomplished of 200° C. for 45 minutes. Another suitable conductive epoxy material containing copper particles is CONDUCT X-5001 supplied by Electro-Kinetic Ssytems, Chester, Pa. It is also possible to apply a thin coating of highly solderable silver paste over the metal loaded epoxy end cap and curing.

According to one procedure in keeping with this invennion the encapsulated bodies 10 as shown in FIG. 5 suspended from the carrier bar 17 are dipped into a bath (not shown) of the silver composition to a depth to completely cover the bodies 10 and a portion of the riser wire 12. The bodies 10 with a silver coating are withdrawn, air dried and then suitably processed by removal of selected portion of the silver coating to provide end caps 26 and 29 and a portion 30 which is free of silver as shown in FIGS. 6 and 7.

As illustrated in FIG. 6 the conductive end cap 26 is formed over the cathode end of the body 10 and is bonded directly in conductive contact with the counterelectrode 16 there. The end cap 25 extends partially over the side portion of the encapsulation 25. The end cap 26 closely conforms to the smooth outer surface of the encapsulation 25 and to the counterelectrode 16. As illustrated in FIGS. 6 and 7 the conductive end cap formed over the anode end extends from the wire 12 across the surface of the concavity 27 and over the borders 28 and partially over the side of encapsulation 25.

The finished molded unit as illustrated in FIG. 6 shows the encapsulation 25 is in intimate contacting attachment to the side of the capacitor body and to the end from which the anode wire 11 extends. Thus there is an interface between the encapsulation 25 and the counterelectrode 16 extending all along the axial dimension of the counterelectrode to the bottom surface at the end opposite the anode wire 11. Thus this interface or joint between the encapsulation 25 and the counterelectrode 16 provides insulation and isolation of the delicate counterelectrode within a precise, simple and effective protection.

This feature is important to the purpose of the present invention in providing good volumetric efficiency.

FIG. 7 illustrates the features of the finished capacitor of this invention. The good volumetric efficiency is achieved by virtue of the cathode end cap 26 being formed directly against the silver cathode counterelectrode 16 and the encapsulation 25 provides smooth outer surfaces of the finished unit while providing volumetric efficiency. The finished unit provides the advantage, ease of handling in manufacturing apparatus. Also the finished unit has good flush mounting properties.

In the illustrated embodiment of the present invention the molded encapsulation is formed with a concavity 27 at the anode wire 12 end of the unit. From the center of this concavity 27 the anode wire 12 extends, but is cut so that the wire 12 does not extend beyond the borders 28 of the concavity formed in the coating. Concavity 27 also lessens the chance of losing contact between wire 12 and cap 29 by holding a pool of the silver against the wire.

It will be seen that in the finished unit as illustrated in FIG. 7, the termination of the unit is such that the capacitor may be flush mounted to a printed circuit by soldering. The trim outline provided by the present advance provide smooth surfaces and sharp edges which are useful in handling of the capacitor by automatic pick-and-place equipment. At the same time regulated application of encapsulant contributes to volumetric efficiency.

In a modified embodiment of the present invention the bodies 10 on the carrier bar 17 as illustrated in FIG. 2 may be provided with additional silver at the bottom or cathode ends of the bodies 10 prior to the molding step. Then the bodies are inserted into the mold parts 18a, 18b and the silver coated ends are pushed against the metal back of the mold in the absence of a tape. Sufficient silver is applied to the ends of the capacitor bodies to effectively seal the mold cavities from each other and seal the molding encapsulant away from the bottom end of the bodies 10.

Then after demolding when the encapsulated bodies are in the interim stage, illustrated for the preferred embodiment in FIG. 5 the extra silver is abraded away leaving the necessary silver cathode contact for the subsequent in-situ building of the end caps.

While the present advance has been described as embodied in the fabrication of solid electrolyte capacitors by applying an insulative protective layer by molding an encapsulant around the capacitor body, it will be understood that features of the contribution can be accomplished with insulative protective coatings applied by other casting or potting methods. The feature specifically illustrated above which may be employed in casting or potting procedures is the moving of the suspended capacitor bodies with the bottom ends of the plurality of units into engagement with a means for sealing the bottom ends from the protective material while the material is being applied to the remainder of the body surfaces.

The above description explains how the stated objects are accomplished. The batch process steps provide a means for easily and repetitively achieving volumetric efficiency by regulating the proportion of insulative cover applied to the active capacitor sections and at the same time providing a trim product which is suitable for handling in assembly machinery and procedures.

I claim:

1. In a batch method of making solid electrolyte capacitors covered by a protective insulation layer by suspending a plurality of film-formed porous valve-metal pellets from a holding bar by an anode wire extending from each of said pellets, each of said pellets being coated with a solid electrolyte and an overlying counterelectrode, the improvement which comprises the steps of positioning the end face of each of said suspended pellets opposite from said anode wire upon an adhesive coated surface of cavities so as to contact said opposite end face on said surface while the remainder of the surface of each said pellet is exposed within said cavities, and then applying an encapsulant in said cavities and covering said suspended pellets with a coating on each said exposed pellet surface, and maintaining said opposite end face substantially free of said encapsulant, and subsequently removing said bar of coated pellets from said contacting surface, and finally forming a conductive end cap directly over and in contact with said counterelectrode on said opposite end face to thereby provide conductive contact between said end cap and said counterelectrode at said opposite end face.

2. The method of claim 1 wherein making said capacitors includes positioning the ends of the suspended pellets opposite to the ends from which the anode wires extend upon a deformable material forming a surface of the mold cavities to contact said opposite end face in the deformable material while the remainder of the surface of coated pellets is exposed within the mold cavities, and then applying an encapsulant into the mold cavities, and molding the suspended pellets with a coating of encapsulant on the exposed pellet surface, and maintaining the opposite end face substantially free of encapsulant, and subsequently removing the bar of suspended pellets from the mold cavities including removing the deformable material from the encapsulated pellets prior to said application of said end cap.

3. The batch method of claim 1 additionally comprising applying an adhesive tape across the bottoms of the suspended pellets, subsequently inserting the film formed and coated suspended pellets in mold cavities, pressing the ends of the suspended pellets opposite to the ends from which the anode wires extend upon the adhesive tape so that the tape forms a surface of the mold cavities in contacting said opposite ends in the tape, while the remainder of the surface of coated pellets is exposed within the mold cavities, pressing the cavity side walls against the adhesive tape prior to said encapsulation, and subsequently removing the bar of suspended pellets from the mold cavities including removing the tape from the encapsulated pellets prior to said application of the end cap.

4. The batch method of claim 1 additionally comprising inserting the film formed and coated suspended pellets in a molding means comprised of a plurality of cavities separated by intervening cavity forming walls pressing the ends of the suspended pellets opposite to the ends from which the anode wires extend upon an adhesive tape extending across said molding means at open ends of said cavities so that the tape forms a surface of the mold cavities in contacting said opposite ends in the tape, while the remainder of the surface of coated pellets is exposed within the mold cavities.

pressing the cavity walls against the adhesive tape, and then applying an encapsulant into the mold cavities and molding the suspended pellets with a coating on the exposed pellet surface, and maintaining the opposite end surface substantially free of encapsulant and subsequently removing the bar of the suspended pellets from the mold cavities including removing the tape from the encapsulated pellets prior to said application of the end cap.

* * * * *

UNITED STATES PATENT AND TRADEMARK OFFICE
CERTIFICATE OF CORRECTION

PATENT NO. : 4,688,322
DATED : August 25, 1987
INVENTOR(S) : Mary A. Macdonald

It is certified that error appears in the above—identified patent and that said Letters Patent is hereby corrected as shown below:

Cover page, Item [19] reading "Fossey" should read --Macdonald--.

Cover page, under "[75] Inventor:"
"Mary A. Fossey" should read -- Mary A. Macdonald --

Signed and Sealed this

Fifteenth Day of December, 1987

Attest:

DONALD J. QUIGG

*Attesting Officer*  *Commissioner of Patents and Trademarks*